Nov. 21, 1950 R. H. LINDSEY 2,531,064
DEVICE FOR CLEANING FISH
Filed Dec. 26, 1947
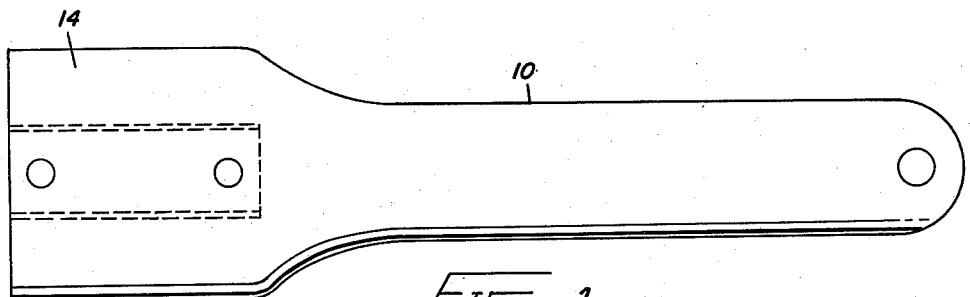
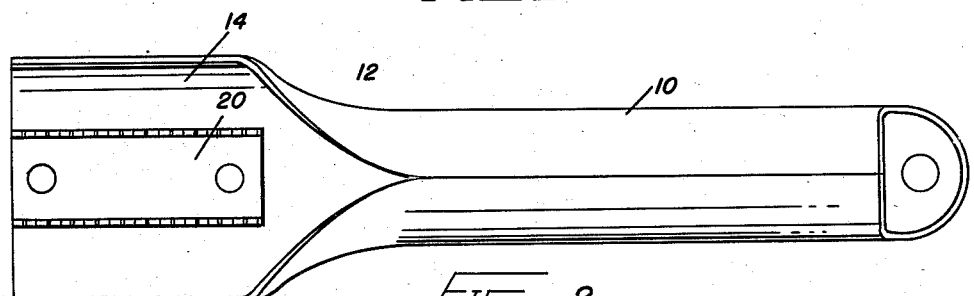
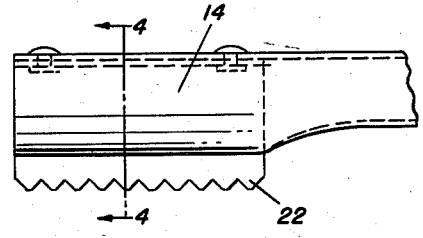
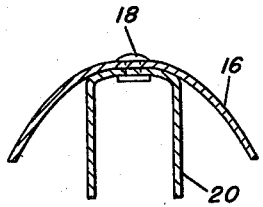
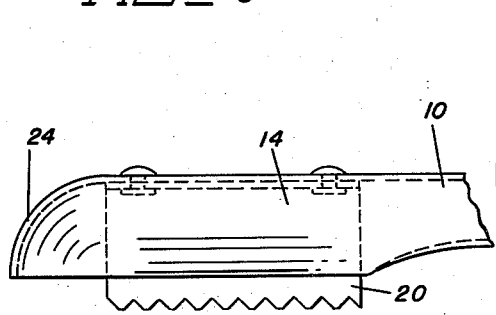
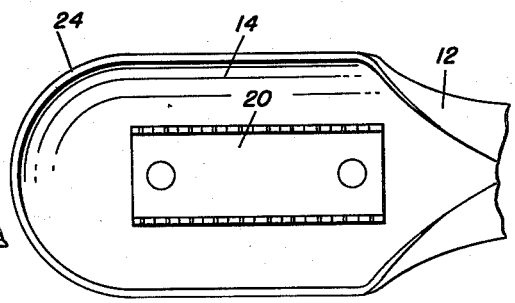
INVENTOR.
RICHARD H. LINDSEY
BY
ATTORNEYS.

UNITED STATES PATENT OFFICE 2,531,064

DEVICE FOR CLEANING FISH

Richard H. Lindsey, Detroit, Mich.

Application December 26, 1947, Serial No. 793,798

2 Claims. (Cl. 17—7)

This invention relates to a device for cleaning fish and more particularly to a device for removing scales on a fish.

Scaling fish is most commonly effected by scraping a knife or a toothed blade over the body of the fish in a direction opposite to that in which the scales are disposed. In this manner, the blade engages the loose ends of the scales and separates the scales from the skin of the fish. In most instances, this task is most annoying due to the fact that the scales are somewhat resilient and scatter in all directions when the fish is being scraped in this manner.

It is an object of this invention to provide an implement for scaling fish which prevents the scales from flying in all directions when the fish is being scaled in the ordinary manner.

It is a further object of this invention to provide an implement for scaling fish having a guard surrounding the toothed portion of the blade which serves as a shield under which the fish scales will be retained; the guard also being arranged so that it limits the extent to which the toothed portion of the blade can penetrate the surface of the fish and thereby prevents the skin from being gouged or torn by the blade portion.

Due to the fact that the scales of a fish, unless restrained, scatter widely during the scaling operation, it has been quite common, in the past, when a sportsman brings in his catch, to perform the scaling operation outside the house to thus prevent the scales from scattering through the household. The tool of the present invention traps the scales and accumulates them within the guard so that the scaling operation can be performed within the household.

In the drawings:

Figure 1 is a top view of an implement for scaling fish embodying the one form of the present invention.

Figure 2 is a bottom view of the device.

Figure 3 is a partial side elevation of the device showing the comparative heights of the blade and shield.

Figure 4 is a sectional view taken substantially along line 4—4 in Figure 3 illustrating the contours of the blade and shield.

Figure 5 is a partial side elevation of another form of the invention.

Figure 6 is a bottom view of the device shown in Figure 5.

The fish scaler of this invention is preferably formed of sheet metal and as illustrated in the drawings is provided at one end with a tubular handle portion 10 which is rolled, stamped or otherwise formed as shown. At the forward end handle 10 is flared outwardly as at 12 and terminates in a shield 14 of concave-convex cross section having side portions 16 as is best shown in Figure 4. The sheet stock of which the implement is made is preferably of corrosion resisting metal such, for example, as stainless steel, or Monel metal or the like.

To the underside of shield 14 there is attached as by rivets 18 a sealer or bladed member 20. This member is of U-shape with its bight portion secured to the shield as by means of rivets 18 and with its legs forming blades 20 and 21. The blades extend lengthwise of handle 10 and are disposed centrally of the shield so that the shield overhangs both blades. The edges of the blades project a slight distance below the overhanging edges 16 of shield 14 and are serrated as at 22 to provide tooth portions which are adapted to loosen and remove the scales when a fish is scraped with the device.

It will be observed that by providing blades 20 and 21 with the shield 14 overhanging the blades in this manner, when the scales are broken loose from the fish by means of the tooth portions 22, the scales are caught and accumulated by the underside of the shield. The shield also serves to prevent the blades from being disposed at such an acute angle relative to the surface worked upon as to cause the blades to cut into the flesh of the fish. Normally, the tool is reciprocated with the blades 20 and 21 substantially perpendicular to the surface. The shield prevents the tool from being tipped to such an angle that the blades will cut into the fish.

Obviously shield and blades can be shaped other than as shown in the drawings, the invention being primarily directed to the provision of an overhanging shield for the blades which serves to catch the scales as they are separated from the skin of the fish and at the same time prevent the blade from digging into the fleshy portions of the fish. Thus the shield may be formed with an overhanging portion 24 extending entirely around the forward end as well as the sides of the blade as is shown in Figures 5 and 6.

I claim:

1. An implement for scaling fish comprising, a body of sheet metal fashioned to provide a substantially tubular handle portion with the edges of the sheet metal in substantially abutting relationship, the said edges, adjacent one end of the body, having parts diverging from each other and having end parts spaced from each other in parallel manner to form a concave-convex shield, and blade means in the concavity of the shield and comprising, a sheet metal element formed into elongated U-shape open at both ends, means securing the bight portion of the blade means to the shield, the legs of the U projecting beyond the spaced parallel edges of the concave-convex shield and said edges being serrated for engaging and removing the scales.

2. An implement for scaling fish comprising, a body constituted by a single piece of sheet metal having its major portion fashioned substantially into tubular form with opposite edges adjacent each other and constituting a handle section, the edges of the sheet metal at one end of the body being spaced apart and substantially parallel to each other with the metal between the said spaced edges being concavo-convex in form to provide a shield section, the said edges between the handle section and the shield section diverging from each other and the metal of the sheet between the diverting edges being of tapered form to provide an intermediate section, and an elongated blade constituted by a metal piece fashioned into U shape in cross section and disposed in the concavity of the shield section, with the length of the U shape extending axially and in substantial alignment with the handle section, means securing the bight portion of the U-shaped blade to the central part of the concaved side of the shield section, the legs of the U-shaped blade extending out of the concavity and beyond said parallel edges of the shield section, so that the edges of the blade are exposed, and said edges of the blade being serrated.

RICHARD H. LINDSEY.

REFERENCES CITED

The following references are of record in the file of this patent:

UNITED STATES PATENTS

| Number | Name | Date |
| --- | --- | --- |
| 734,210 | Whitford | July 21, 1903 |
| 1,061,014 | Sawyer | May 6, 1913 |
| 1,236,369 | Easby et al. | Aug. 7, 1917 |
| 1,997,339 | Olson | Apr. 9, 1935 |
| 2,109,859 | Cope | Mar. 1, 1938 |